(12) United States Patent
Sullivan

(10) Patent No.: US 7,894,044 B1
(45) Date of Patent: Feb. 22, 2011

(54) LASER FOR COHERENT LIDAR

(75) Inventor: Christopher J. Sullivan, Honolulu, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 40 days.

(21) Appl. No.: 12/381,388

(22) Filed: Mar. 11, 2009

Related U.S. Application Data

(60) Provisional application No. 61/068,927, filed on Mar. 11, 2008.

(51) Int. Cl.
*G01C 3/08* (2006.01)

(52) U.S. Cl. .................................... 356/4.01; 356/5.01

(58) Field of Classification Search ....... 356/4.01–5.01, 356/28
See application file for complete search history.

(56) References Cited

U.S. PATENT DOCUMENTS

| | | | | |
|---|---|---|---|---|
| 5,767,976 | A * | 6/1998 | Ankerhold et al. .......... | 356/437 |
| 6,031,850 | A | 2/2000 | Cheo | |
| 6,081,369 | A | 6/2000 | Waarts et al. | |
| 6,226,076 | B1 * | 5/2001 | Yoshida ..................... | 356/5.06 |
| 6,246,468 | B1 | 6/2001 | Dimsdale | |
| 6,433,860 | B1 * | 8/2002 | Ohishi ....................... | 356/5.01 |
| 6,448,572 | B1 | 9/2002 | Tennant et al. | |
| 6,518,562 | B1 | 2/2003 | Cooper et al. | |
| 6,542,227 | B2 | 4/2003 | Jamieson et al. | |
| 6,587,073 | B2 * | 7/2003 | Schiek et al. ............... | 342/124 |
| 6,593,582 | B2 | 7/2003 | Lee et al. | |
| 6,608,669 | B2 | 8/2003 | Holton | |
| 6,664,533 | B1 | 12/2003 | Van der Laan et al. | |
| 6,847,462 | B1 | 1/2005 | Kacyra et al. | |
| 6,894,767 | B2 * | 5/2005 | Ishinabe et al. ............. | 356/5.01 |
| 7,379,166 | B2 * | 5/2008 | Meneely et al. ............. | 356/28.5 |
| 7,460,215 | B2 * | 12/2008 | Ehbets ....................... | 356/4.01 |
| 7,719,663 | B2 * | 5/2010 | Kawakatsu ................ | 356/28.5 |

OTHER PUBLICATIONS

Kolev, Ivan et al., *Lidar determination of winds by aerosol inhomogeneities—Motion velocity in the planetary layer.*, Applied Optics, vol. 27; Jun. 15, 1988; pp. 2524-2531 (Abstract only).

Taczak & Killinger: *Development of a tunable, narrow-linewidth, cw 2.066-$\mu m$ Ho:YLF laser for remote sensing of atmospheric $CO^2$ and $H^2O$*; Applied Optics; vol. 37, No. 36; pp. 8460-8476.

Paschotta et al., *Passively Q-switched 0.1-mJ fiber laser system at 1.53 $\mu m$*; Optics Letters; vol. 24, No. 6; Mar. 10, 1999; pp. 388-390.

Pekka Ravila et al., *New laser ceilometers using enhanced single lens optics* 3 pages; Source unknown.

* cited by examiner

*Primary Examiner*—Isam Alsomiri
(74) *Attorney, Agent, or Firm*—James Creighton Wray

(57) ABSTRACT

A method for achieving optimum coaxial lidar configuration using optical fibers. Optical fibers are used with mirrors or lenses to create light paths that can achieve an optimum lidar configuration while employing fewer components than that of prior art for a more simplified, lightweight, and less expensive system to produce. The lidar components, including the laser source and the light detector unit, may be placed in a separate housing. A separate housing eliminates unnecessary weight in the optical telescope assembly, makes scanning of the system easier, and enables a better omni-directional cloud height indicator.

20 Claims, 13 Drawing Sheets

LASER FOR COHERENT LIDAR

This application claims the benefit of U.S. Provisional Application No. 61/068,927, filed Mar. 11, 2008, which is hereby incorporated by reference in its entirety.

TECHNICAL FIELD OF THE INVENTION

The present invention relates to lidar.

BACKGROUND OF THE INVENTION

The very earliest cloud height measurements utilized ceiling balloons of various weights and lifts, inflated with helium. The time interval between the release of the balloon and its entry into the base of the clouds was recorded. The point of entry for layers aloft was considered as midway between the point at which the balloon began to fade and that when it completely disappeared. With surface based clouds, the time interval ended when the balloon completely disappeared. During the day, red balloons were used with thin clouds and black balloons were used with thicker clouds and at night, a battery-powered light was attached. Naturally, accuracy using this method depended somewhat on the reactions and eyesight of the observer and could be complicated by such issues as wind and local topography.

In the 1930s, a methodology originated whereby a beam from a ceiling light was projected at a 45-degree elevation into the sky. The projector was rotated about the vertical axis until the light beam hit the lowest cloud. An observer paced off the distance from the projector to a point directly below the illumination spot. With the geometry of this scheme, the paced distance equaled the height of the cloud. This technique was quickly abandoned in favor of a vertically shining light with a clinometer at a previously measured baseline. Knowing the baseline length and elevation angle in this right triangle situation made it easy to determine the height with a lookup table.

Much of the human introduced subjectivity was later removed by automation using a photocell that scanned the vertical path until the spot of light on the cloud was detected. The projector light was modulated so the photocell received less interference from ambient light during daytime use. The angle of inclination was displayed automatically at the observer's console.

The next version of cloud height indicators (CHI) was the rotating beam ceilometer. As the name implies, the beam of light rotated, and the vertically looking detector measured any cloud hits directly overhead. The angle of the cloud hits was displayed either on a scope or on a recorder chart. Height measurements were limited to heights no greater than ten times the base line. Above this ratio, the value of the tangent function increased too quickly to ensure the accuracy of a measurement.

Light detection and ranging (LIDAR) is a method that can be used to characterize the atmosphere, and many methods have been developed to produce LIDAR systems for specific applications. A LIDAR system usually includes a light transmitter, a receiver—including optics and an electronic light detection device, and some type of timing circuitry. LIDARs for cloud ceiling measurement began service with the National Weather Service (NWS) CHI service in 1985. The sensor sends laser pulses vertically into the atmosphere. The pulse rate varies with the temperature to maintain a constant power output. The time interval between the pulse transmission and the reflected reception is used to determine the cloud height. The reporting limit of this instrument for the NWS is 3800 m (12,000 ft).

Different configurations for the transmitting and receiving optics have been developed over the years including the bi-axial or side-by-side configuration, where the transmitter and receiver optics are separate but adjacent. This produces problems in overlap of the transmitting beam and the receiving field of view for certain ranges. The advantage, however, is that the full power of the laser is transmitted, and the full return power from atmospheric backscattering is received by the receiving optics. In a coaxial configuration, the transmitting and receiving optical pathways share the same centroid. For full overlap of the transmitting and receiving optical ray traces, some type of beam splitter is usually employed resulting in up to a 75% loss in optical power due to the two passes through a 50/50 beam splitter, for example. Additionally the receiving field of view includes the optical surfaces where the transmitter light exits. Reflections from these surfaces can result in excessively high power at the receiver, disrupting measurements.

Other configurations have been introduced using a beam-splitting mirror with a hole in it, creating a coaxial configuration, where the transmitting beam suffers no loss on the outgoing path, and the receiving beam is less contaminated with crosstalk from the transmitting beam reflecting off of the outgoing optics. However, while crosstalk is reduced, it is not eliminated. Multiple reflections within the lens can bring light back from the transmitter to the receiver.

Needs exist for improved methods of measuring cloud heights.

SUMMARY OF THE INVENTION

The present invention is methods for achieving optimum coaxial lidar configuration using optical fibers. Optical fibers are used with mirrors or lenses to create light paths that can achieve an optimum lidar configuration while employing fewer components than that of prior art for a more simplified, lightweight, and less expensive system to produce. The lidar components, including the laser source and the light detector unit, may be placed in a separate housing. A separate housing eliminates unnecessary weight in the optical telescope assembly, makes scanning of the system easier, and enables a better omni-directional cloud height indicator. Optical fibers come in a variety of core diameters and Numerical Apertures (NA). The NA determines the divergence angle of the light coming out of the fiber, as well as the acceptance angle for incoming light.

The technology has the following characteristics:

1. Coaxial Transmit and Receive Paths: transmitted and received optical power is along the same axis. This allows for better overlap of fields of view over a longer range 2. Optical Fiber Based: optical fibers are used in key areas to create coaxial transmit and receive beam paths in a compact and lightweight configuration.

3. Low Cross-Talk: the receiver field of view is isolated from receiving light that would reflect off of internal components of the lidar system, eliminating large spikes in return power that would complicate atmospheric lidar measurements.

4. Lightweight: reduction of the weight of the optical assembly allows fast scanning of the optical assembly using low-power motor assemblies.

5. Increased Optical Efficiency: by achieving a coaxial configuration without the use of beam splitters, and optimizing the transmit and return cross-sectional areas, a more sensitive and optically efficient system is produced. This optimal ratio of transmitting area to receiving area is approximately 1:1.

DETAILED DESCRIPTION OF THE PREFERRED EMBODIMENTS

Figure 1:
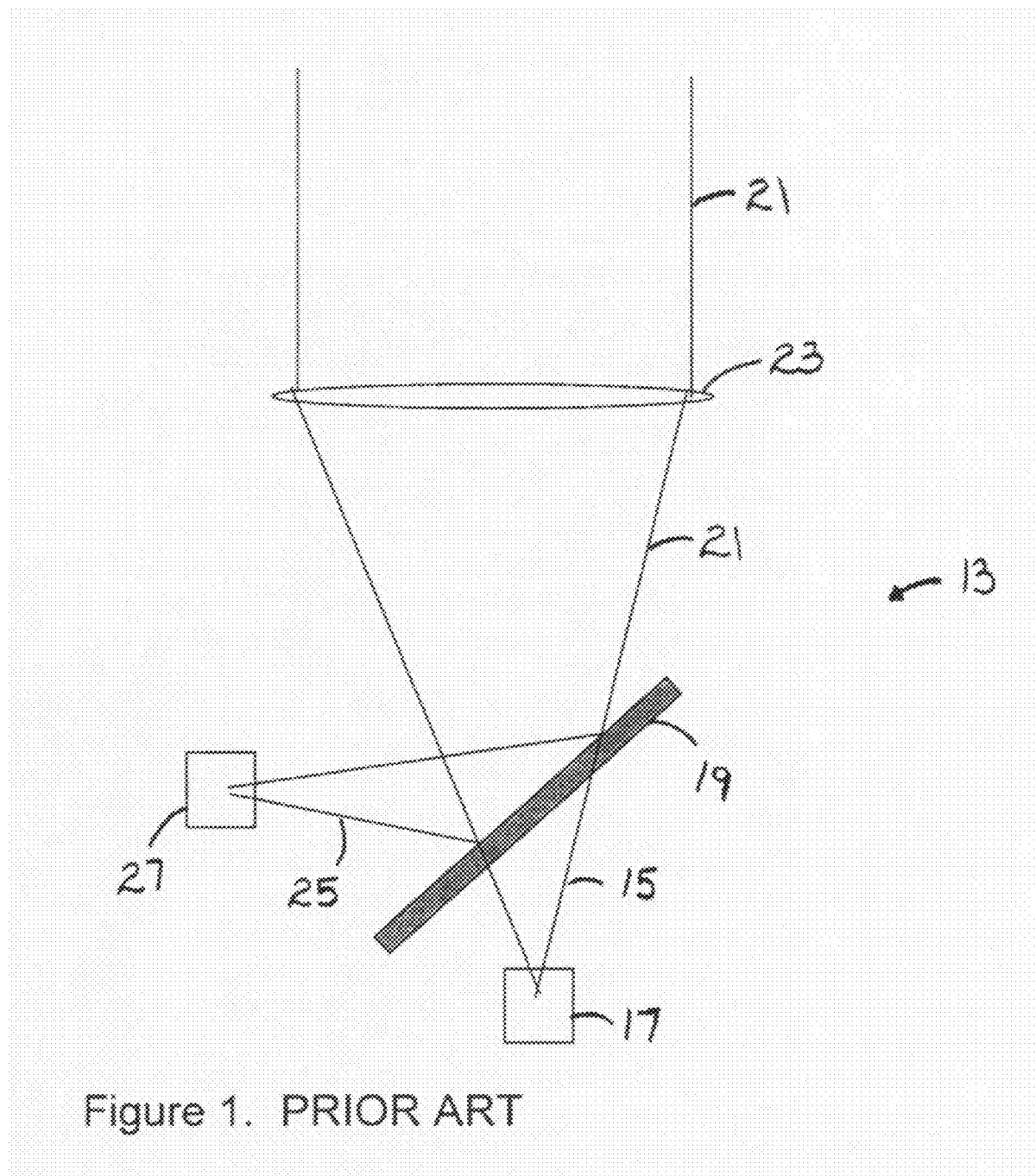
FIG. 1 shows a prior art system where the transmitted beam and the received light share the same aperture.

FIG. 1 shows a prior art system 13. In FIG. 1, a transmitted beam 15 is sent from a transmitter 17. Both the transmitted beam 15 and a received light 21 share an aperture. A beamsplitter 19 allows a portion 21 of the transmitted beam 15 from the laser transmitter 17 through to the lens 23 and reflects part of the return light 25 into a detector 27.

Figure 2:
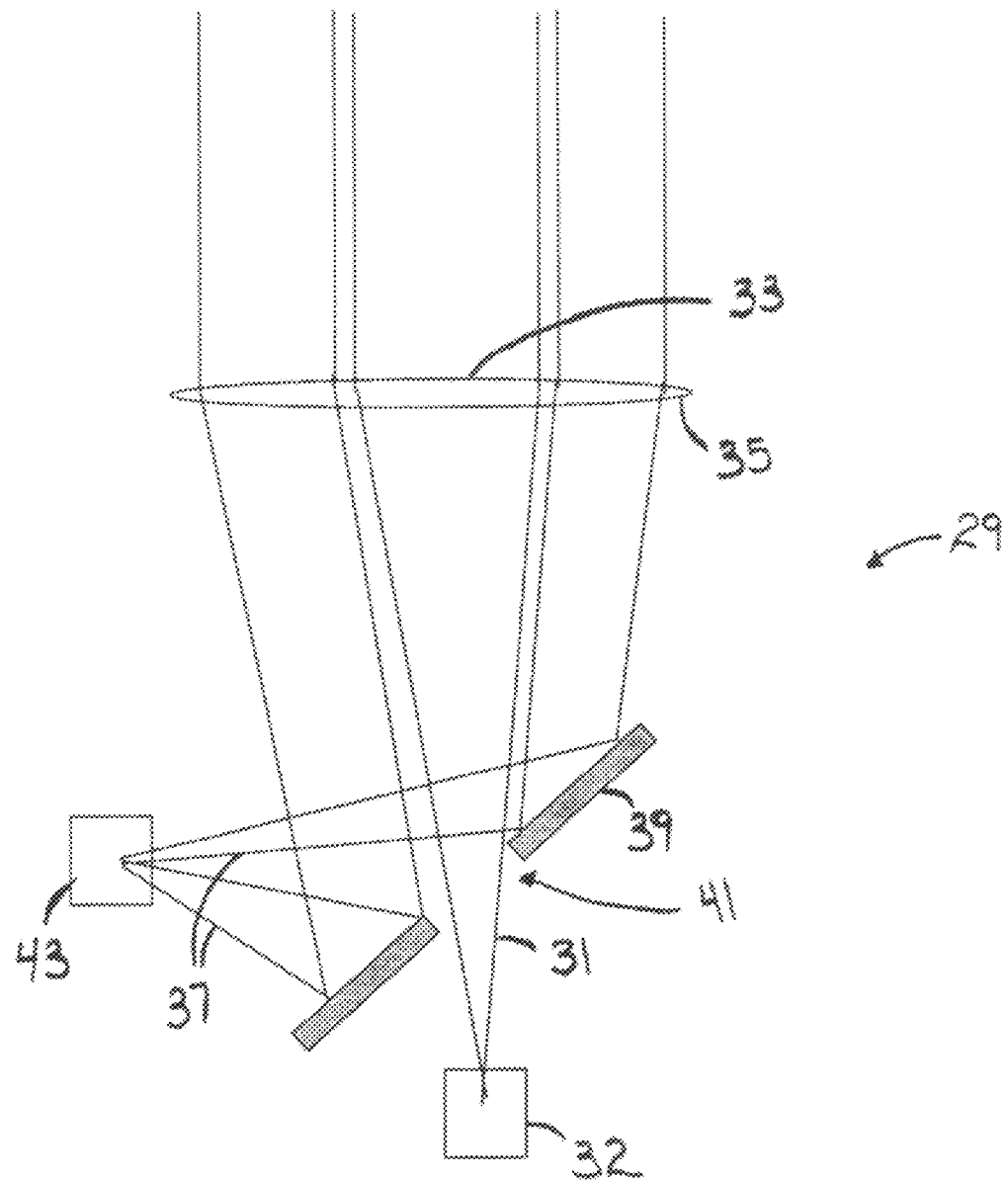
FIG. 2 shows another prior art coaxial system where the transmitted light exits in the center sub-aperture of the lens, and a portion of the return light is reflected off of a mirror with a hole in it into the detector.

FIG. 2 shows another coaxial system 29 where transmitted light 31 from a transmitter 32 exits in a center 33 sub-aperture of a lens 35, and a portion of return light 37 is reflected off of a mirror 39 with a hole 41 in it into a detector 43. The configuration of FIG. 2 reduces reflections of the transmitter off of the lens 35 into the detector 43, which can saturate the detector electronics.

The current invention utilizes a coaxial configuration, but achieves it through different configurations that offer distinct advantages.

Figure 3:
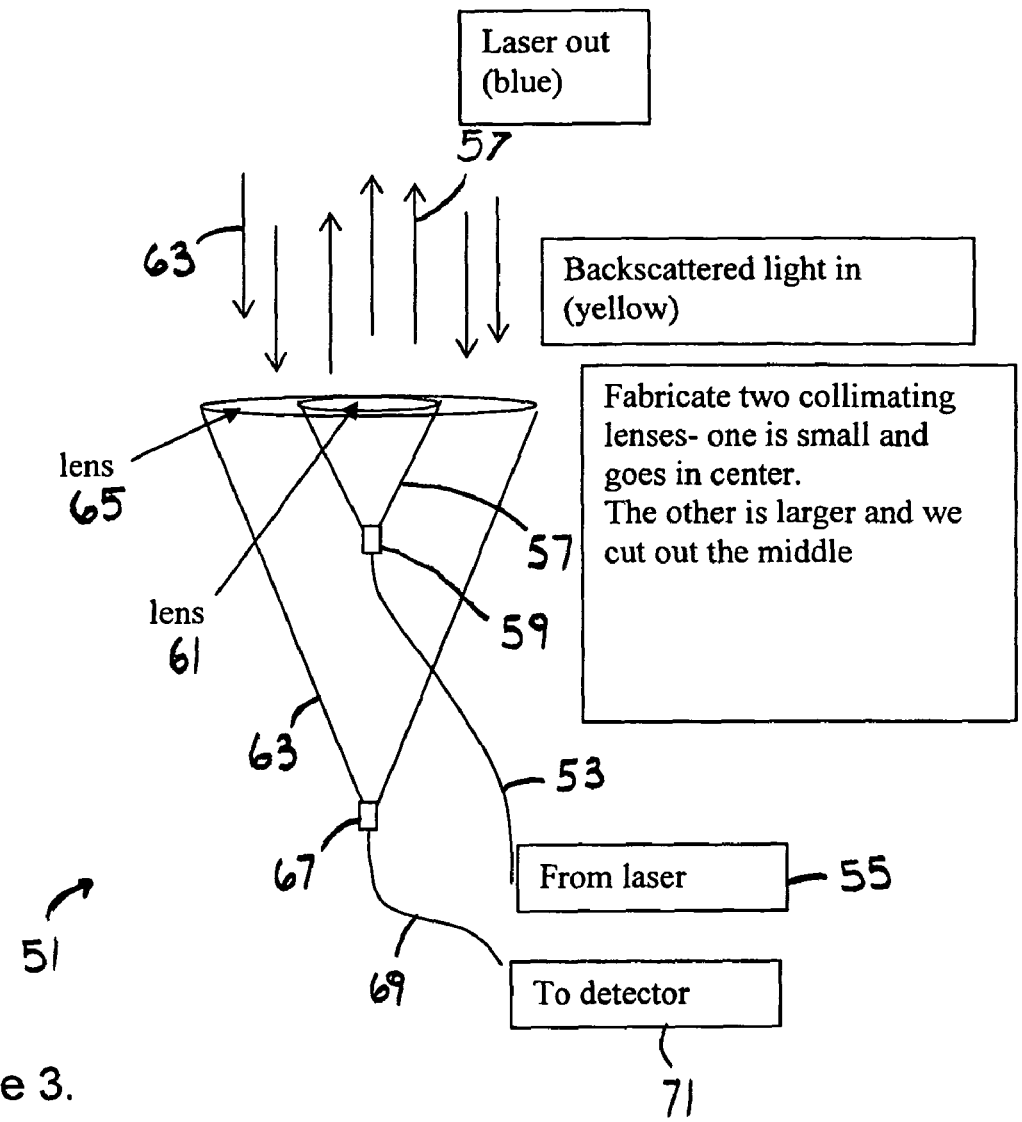
FIG. 3 shows one embodiment that utilizes optical fibers to guide transmitted and received light through lenses.

FIG. 3 shows one embodiment 51, which utilizes optical fibers to guide transmitted and received light through lenses. The transmitter optical fiber 53 comes from a laser source 55. Light 57 is emitted from a fiber end 59 and is collimated via a lens 61. Received light 63 is focused by a ring lens 65 into a receiver optical fiber end 67, through an optical fiber 69 and to a detector 71. This configuration more completely eliminates the possibility of back reflections from the transmitted beam 57 from entering the receiver 67 as the transmitting and receiving lenses 61, 65 are separated and insulated from each other. This configuration is also more compact than prior art and allows separation of the optical assembly from the electronic assembly for ease of manufacturing and maintenance. To create the system of FIG. 3, two collimating lenses are fabricated such that one lens 61 is small and disposed in the center of a larger lens 65 with a cutout in the center.

Figure 4:
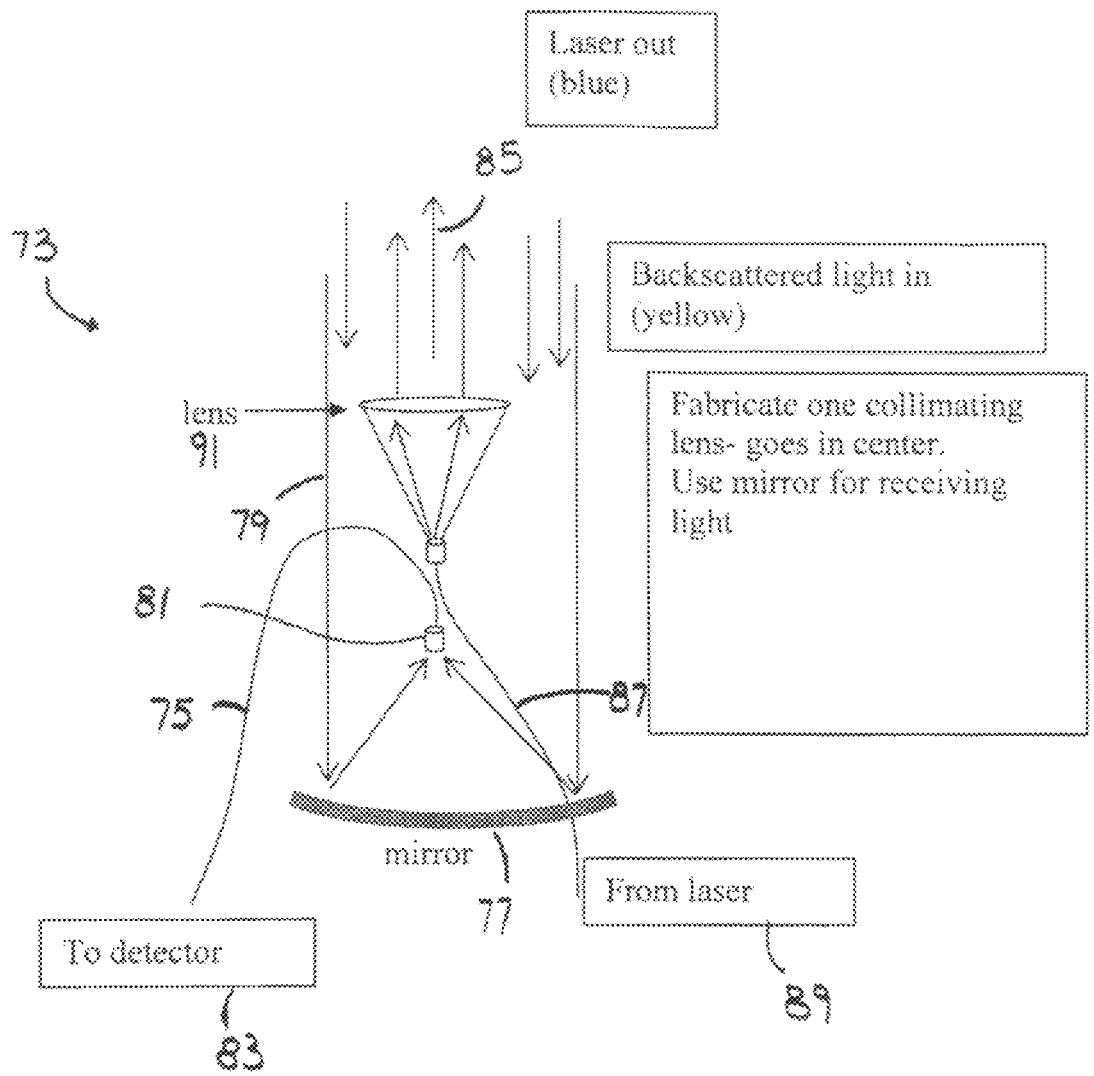
FIG. 4 is an embodiment where the receiver optical fiber is inverted and the receiver optical configuration utilizes a parabolic or spherical mirror to reflect the received light into the receiver optical fiber which guides light to the detector.

FIG. 4 shows an embodiment 73 where a receiver optical fiber 75 is inverted and a receiver optical configuration utilizes a parabolic or spherical mirror 77 to reflect received light 79 into a receiver optical fiber end 81 which guides light through the optical fiber 75 and to a detector 83. Transmitted light 85 travels through a transmitter optical fiber 87 and comes from a laser source 89. The transmitted light 85 passes through a collimating lens 91 in the center of the apparatus 73. This configuration provides a more compact size than the system of FIG. 3, while maintaining the advantage of better isolation of transmit and receive optical paths.

Figure 5:
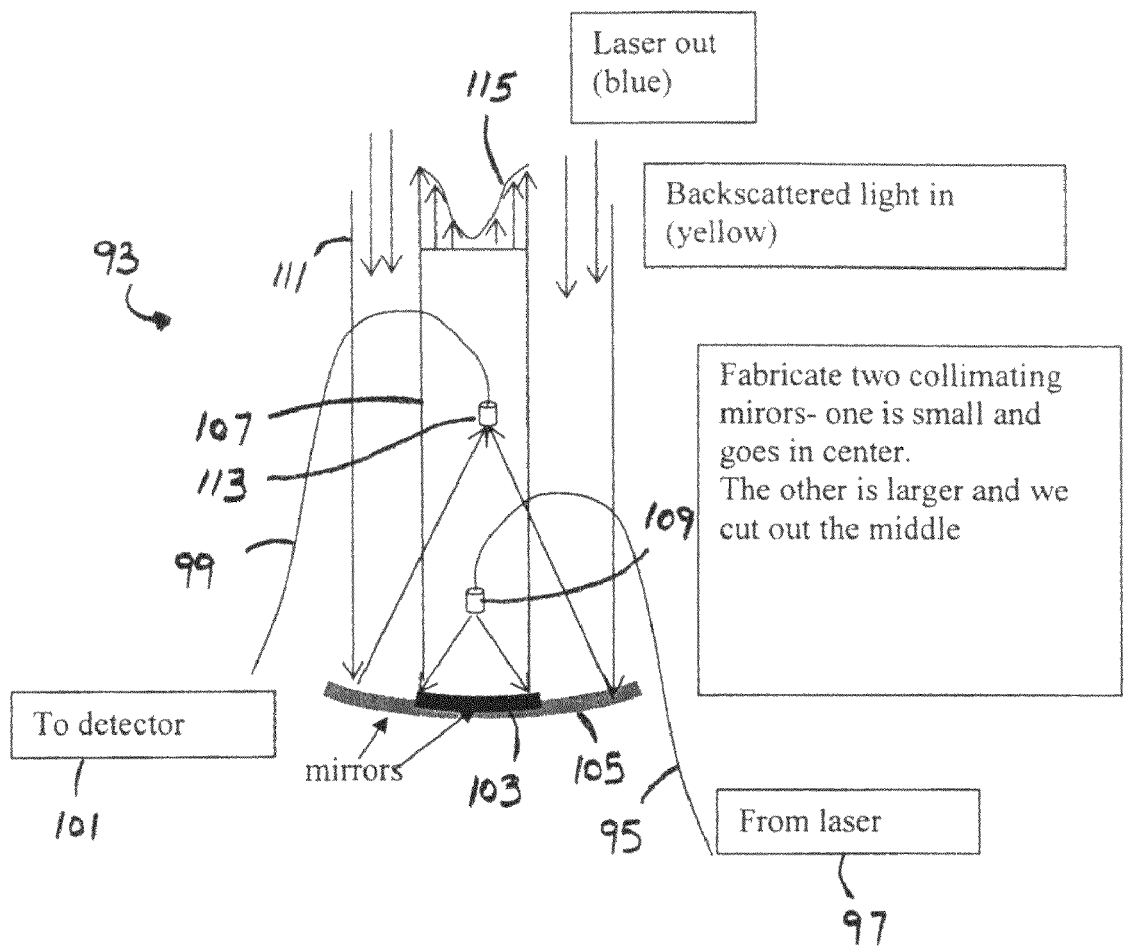
FIG. 5 shows an embodiment where the optical fibers are both inverted, employing independent parabolic or spherical mirrors to achieve the desired optical paths.

FIG. 5 shows an embodiment 93 where both a transmitter optical fiber 95 from a laser 97 and receiving optical fiber 99 to a detector 101 are inverted. The embodiment 93 of FIG. 5 also employs independent parabolic or spherical mirrors 103, 105 to achieve desired optical paths. Transmitted light 107 exits the laser-coupled optical fiber 95 from an optical fiber end 109 and reflects off of the collimating parabolic or spherical mirror 103 to exit the center of the system 93. Return light 111 reflects off of the ring parabolic (or spherical) receiver mirror 105 and is focused into the detector-coupled receiver optical fiber 99 through the optical fiber end 113.

Figure 6:
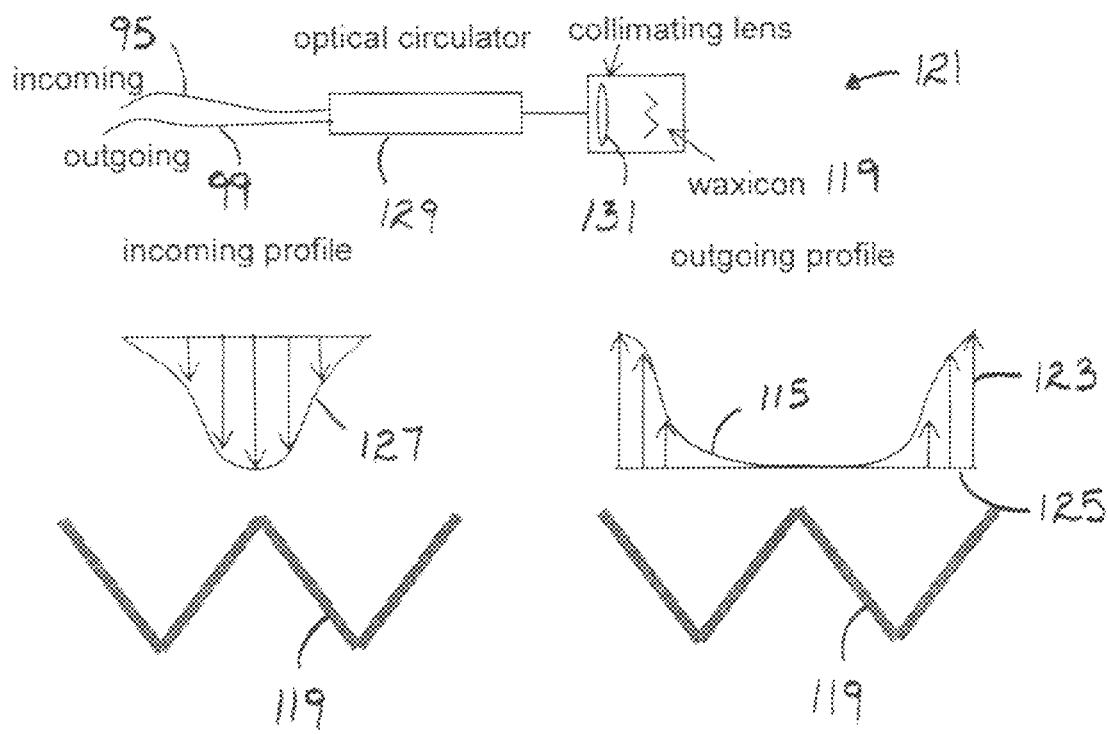
FIG. 6 is a configuration where the brightest part of the beam is then on the outer radius of the transmitted beam and unblocked by the transmitter fiber following reflection off of the parabolic (or spherical) mirror.
Figure 7:
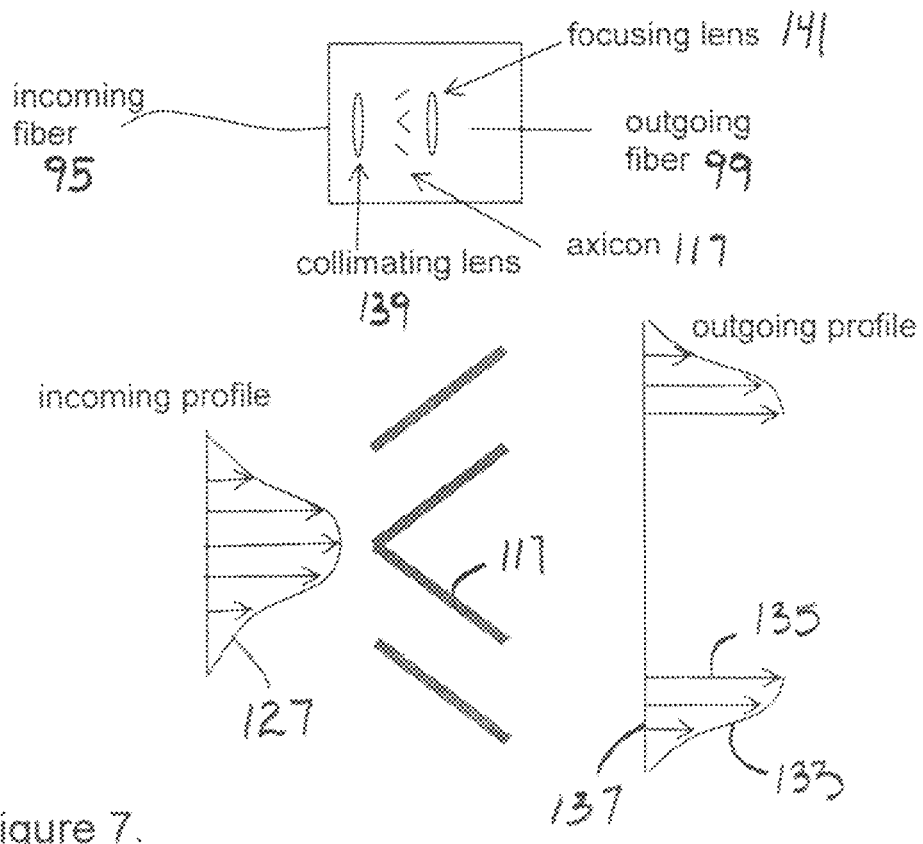
FIG. 7 is a configuration where an axicon is employed to offset the brightest portion of the beam axially outward.

To optimize the transmitted energy, the exit beam profile of the transmitter optical fiber is a Gaussian profile 127 that has been turned inside out 115 through use of an axicon 117 or waxicon 119 as shown in FIG. 6 and FIG. 7. In the case of the configuration 121 in FIG. 6, the brightest part of a beam 123 is then on the outer radius 125 of the transmitted beam and unblocked by the transmitter fiber 95 following reflection off of the parabolic (or spherical) mirror 105. The incoming fiber 95 and outgoing fiber enter an optical circulator 129 and then a collimating lens 131 and the waxicon 119. In the configuration in FIG. 7, an axicon 117 is employed to offset the brightest portion of the beam axially outward 133 so that the brightest part of a beam 135 is at edges 137 of the transmitted beam and unblocked by the transmitter fiber 95 following reflection off of the parabolic (or spherical) mirror 105. The incoming fiber 95 pass light through a collimating lens 139, through the axicon 117, through a focusing lens 141 and into an outgoing fiber 99.

Figure 8:
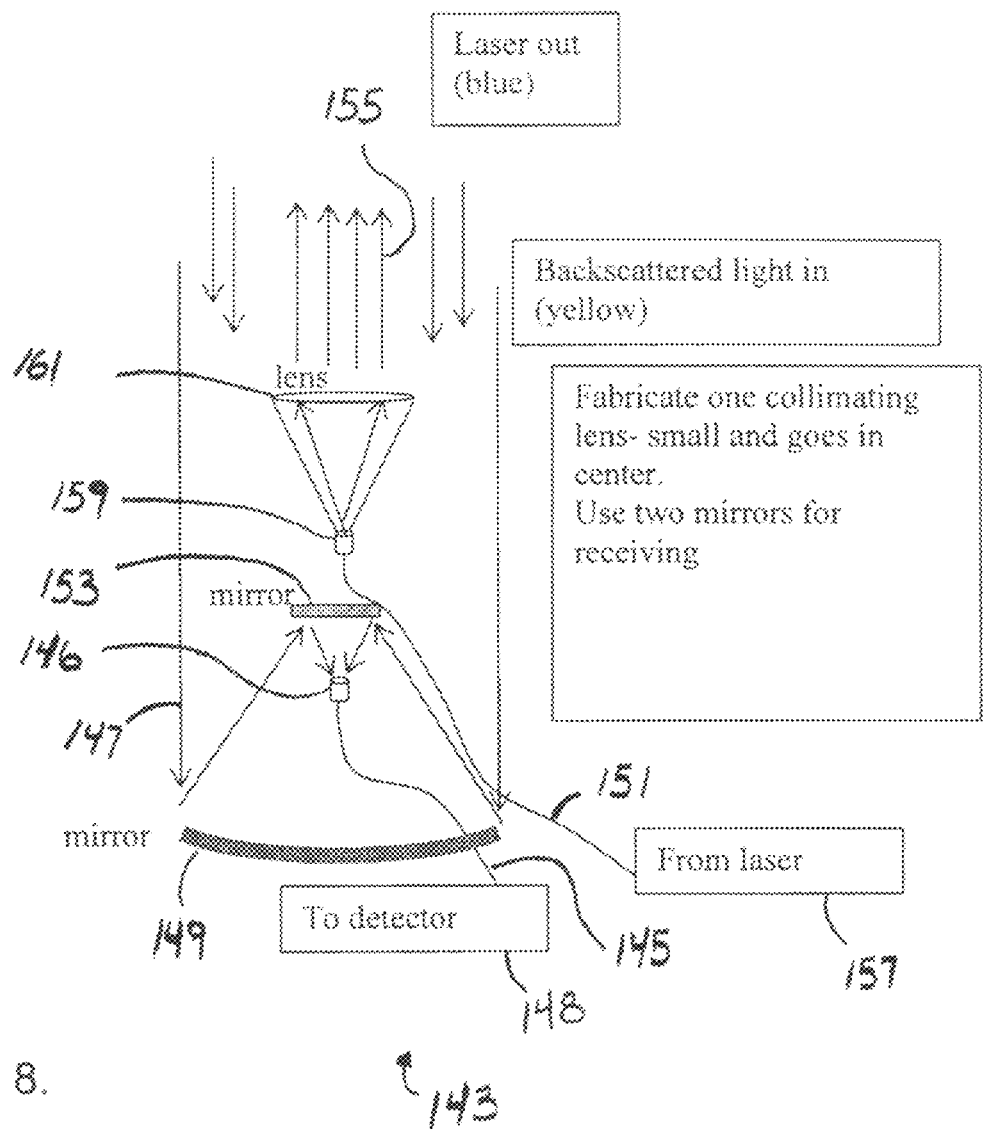
FIG. 8 is another embodiment where the receiver fiber is upright and receives light from a secondary mirror located behind the transmitter fiber.

FIG. 8 shows an embodiment 143 where a receiver fiber 145 is upright and receives light 147 from a secondary mirror 153 located behind a transmitter fiber 151 and receives light at fiber end 146 before a detector 148. The secondary mirror 153 receives light from the parabolic (or spherical) primary mirror 149 below the receiver optical fiber 145. Transmitted light 155 leaves a laser 157, travels through a transmitter fiber 151 and through a fiber end 159. The transmitted light 155 passes through a collimating lens 161 that is small and goes in the center of the apparatus 143. The configuration in FIG. 8 provides a compact co-axial configuration.

Figure 9:
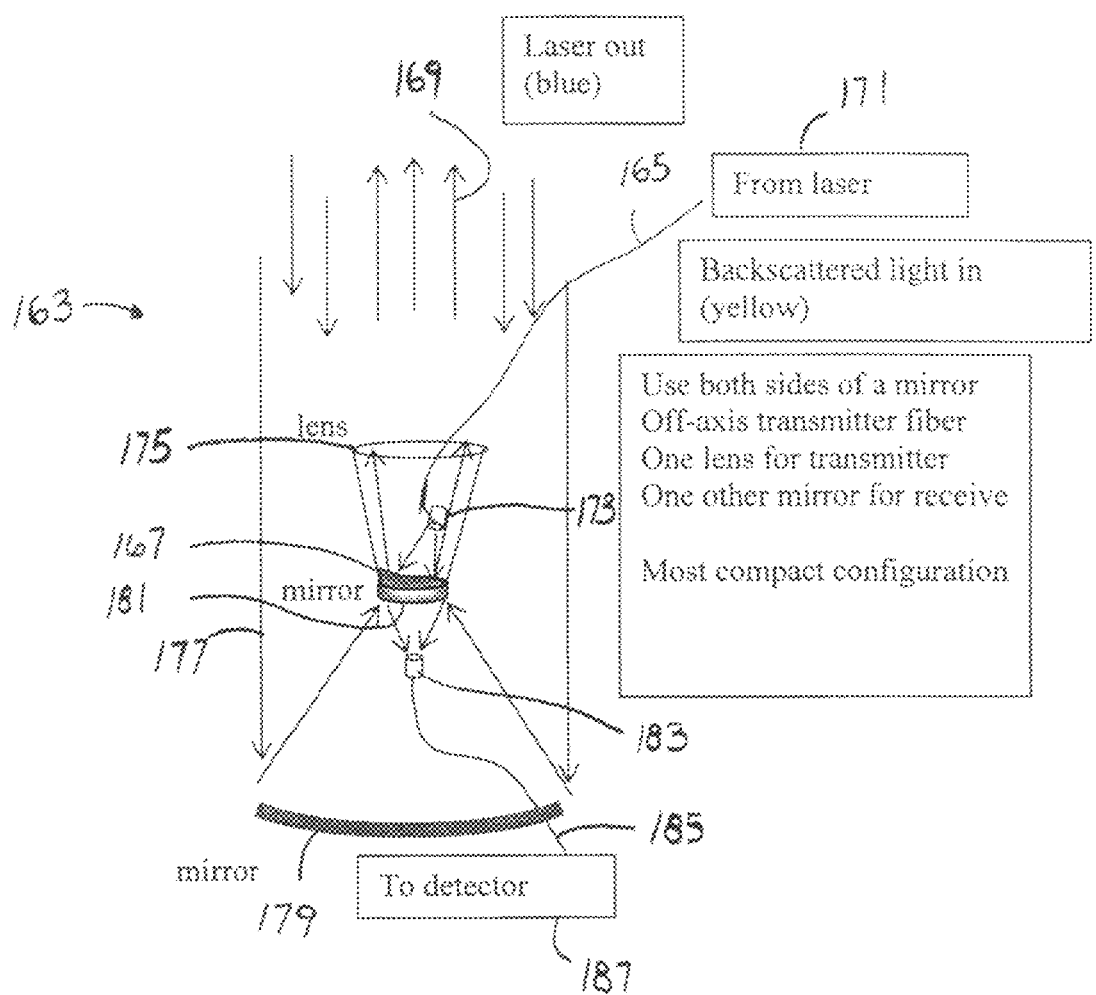
FIG. 9 is an embodiment where the transmitting optical fiber is inverted off angle to a parabolic (or spherical) mirror.

FIG. 9 shows an embodiment 163 where a transmitting optical fiber 165 is inverted off angle to a parabolic (or spherical) mirror 167. Transmitted light 169 is generated by a laser 171, travels through the transmitting optical fiber 165 and exits a fiber end 173 and then reflects off of the mirror 167 and is collimated by the collimating lens 175. Received light 177 is reflected off a second mirror 179 and up to an underside 181 of the first mirror 167. The underside 181 of the first mirror 167 then reflects the received light 177 into a received fiber end 183, through a receiver optical fiber 185 and into a detector 187.

Figure 10:
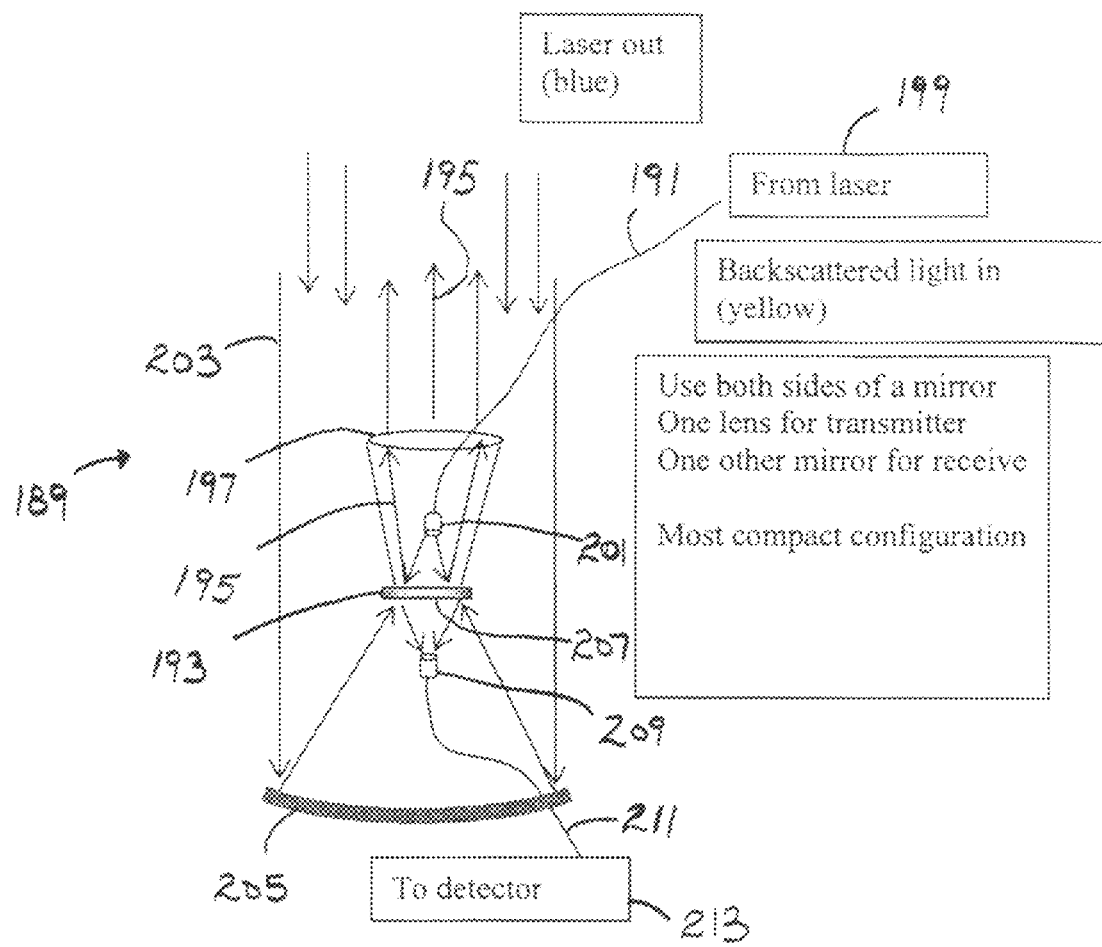
FIG. 10 is an embodiment where the transmitting fiber is directed downward toward a mirror.

FIG. 10 shows an embodiment 189 where a transmitting fiber 191 is directed downward toward a mirror 193. A beam 195 travels from a laser 199, through the transmitting fiber 191, through a fiber end 201, is reflected off the mirror 193 and is reshaped using the system of FIG. 6 or FIG. 7 such that the highest power section of the beam 195 is not blocked before it is collimated by a collimating lens 197. Received light 203 is reflected off a second mirror 205 and up to an underside 207 of the first mirror 193. The underside 207 of the first mirror 193 then reflects the received light 203 into a received fiber end 209, through a receiver optical fiber 211 and into a detector 213.

Figure 11:
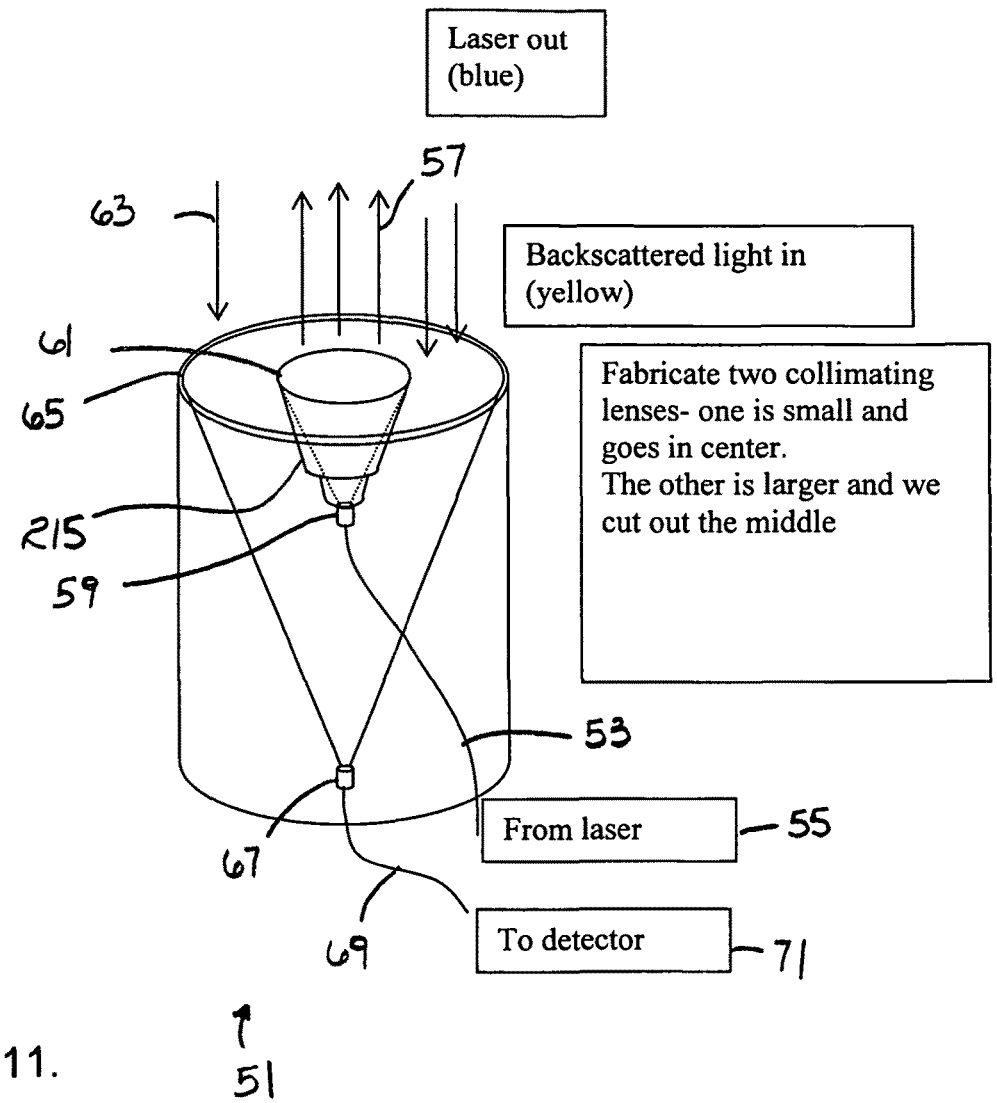
FIG. 11 shows the system of FIG. 3 from a perspective view, where the transmitting optical fiber is connected to a collimating optical subsystem that is supported by the receiving lens.

FIG. 11 shows the system 51 of FIG. 3 from a perspective view, where the transmitting optical fiber 53 is connected to a collimating optical subsystem 215 that is supported by the receiving lens 61.

Figure 12:
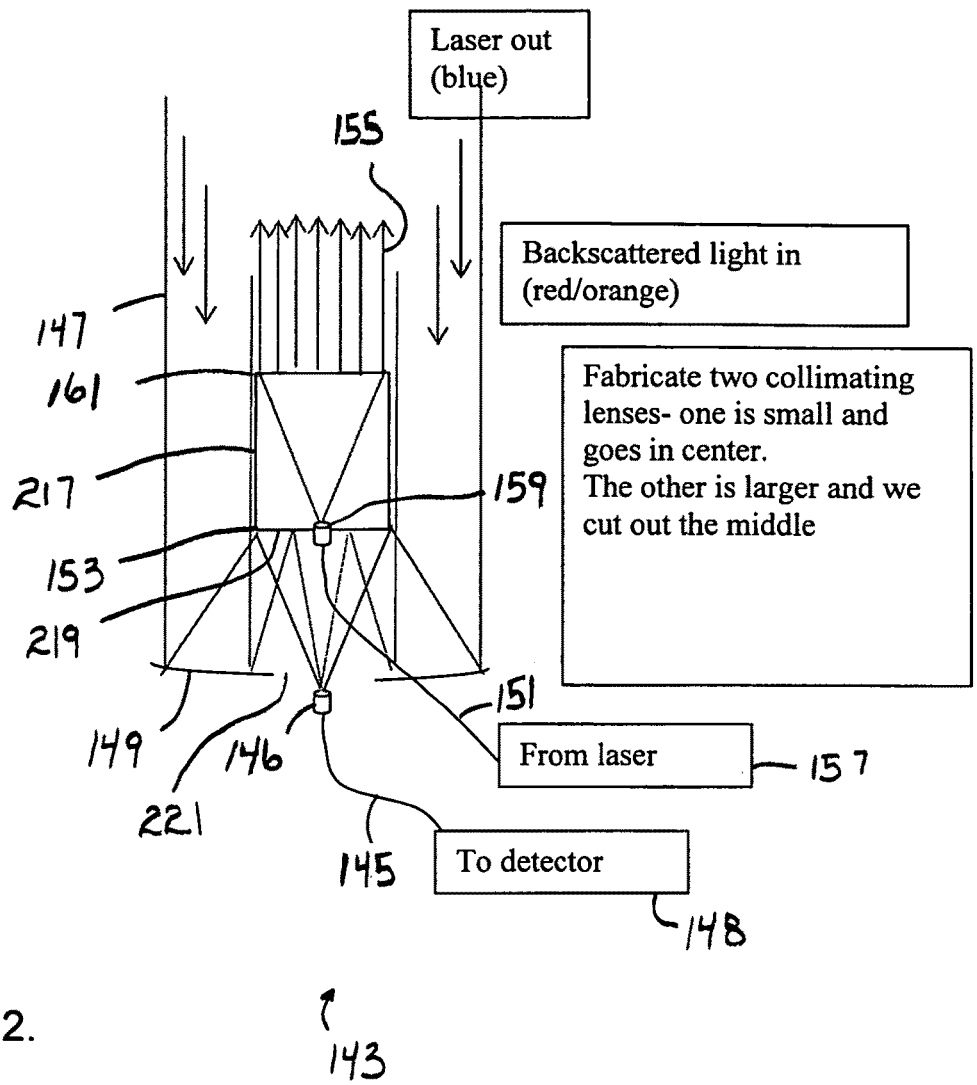
FIG. 12 shows the system of FIG. 8 where the transmitting collimator assembly includes a mirror on its back surface which serves as the receiver secondary mirror.

FIG. 12 shows the system 143 of FIG. 8 where a transmitting collimator assembly 217 includes a mirror 153 on its back surface which serves as the receiver secondary mirror. Received light 147 is reflected one or more times from the mirror 149 to an underside 219 of the first mirror 153 before entering a receiver optical fiber end 146 in an opening 221 in the mirror 149.

Figure 13:
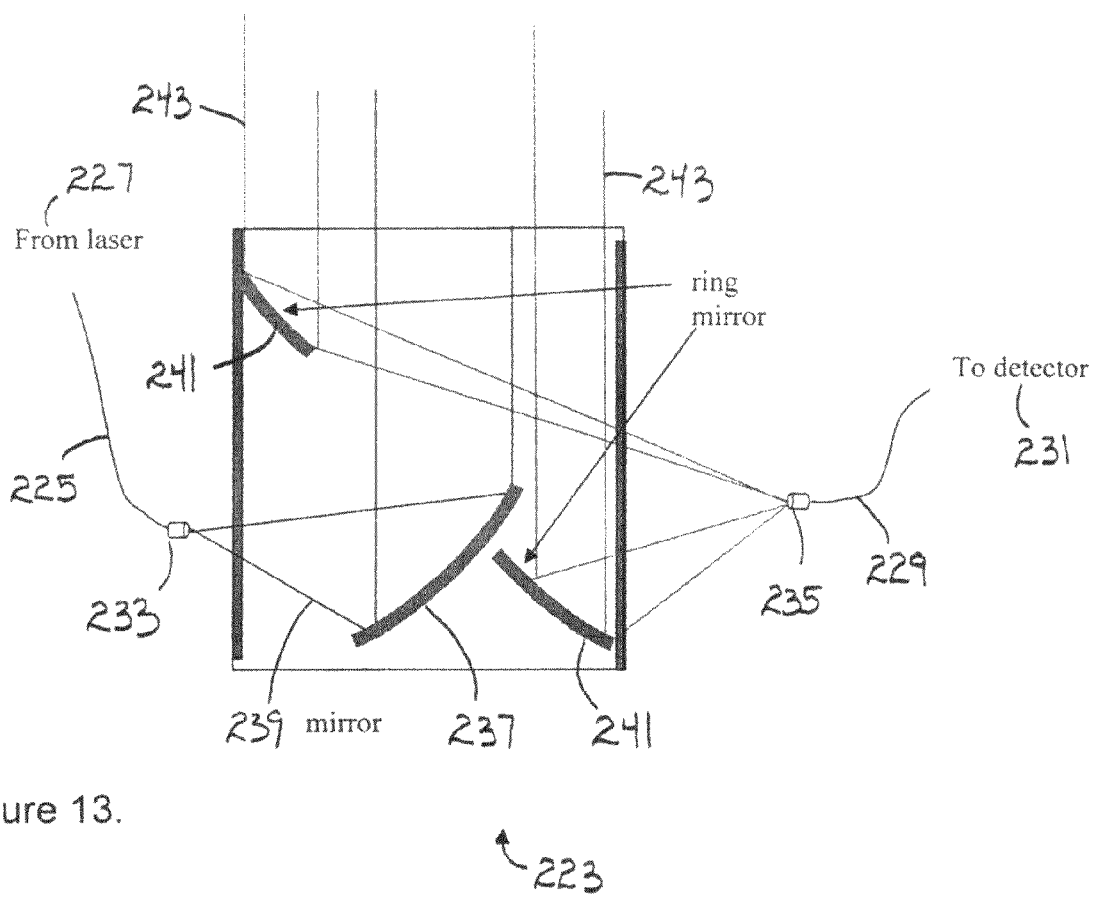
FIG. 13 is an embodiment where the transmitter optical fiber or the transmitter itself, and the receiver optical fiber or the receiver itself are located symmetrically on opposite sides.

FIG. 13 shows an embodiment 223 where a transmitter optical fiber head 233, transmitter optical fiber 225 or a transmitter 227 itself, and a receiver optical fiber head 235, receiver optical fiber 229, or a receiver 231 itself are located symmetrically on opposite sides of the device 223. A parabolic or spherical transmitter mirror 237 in the center of the device 223 collimates transmitted light 239 from the transmitter optical fiber 225. A parabolic (or spherical) ring mirror 241 focuses return light 243 into the receiver optical fiber 229. The system of FIG. 13 is more compact than previous devices.

Figure 14:
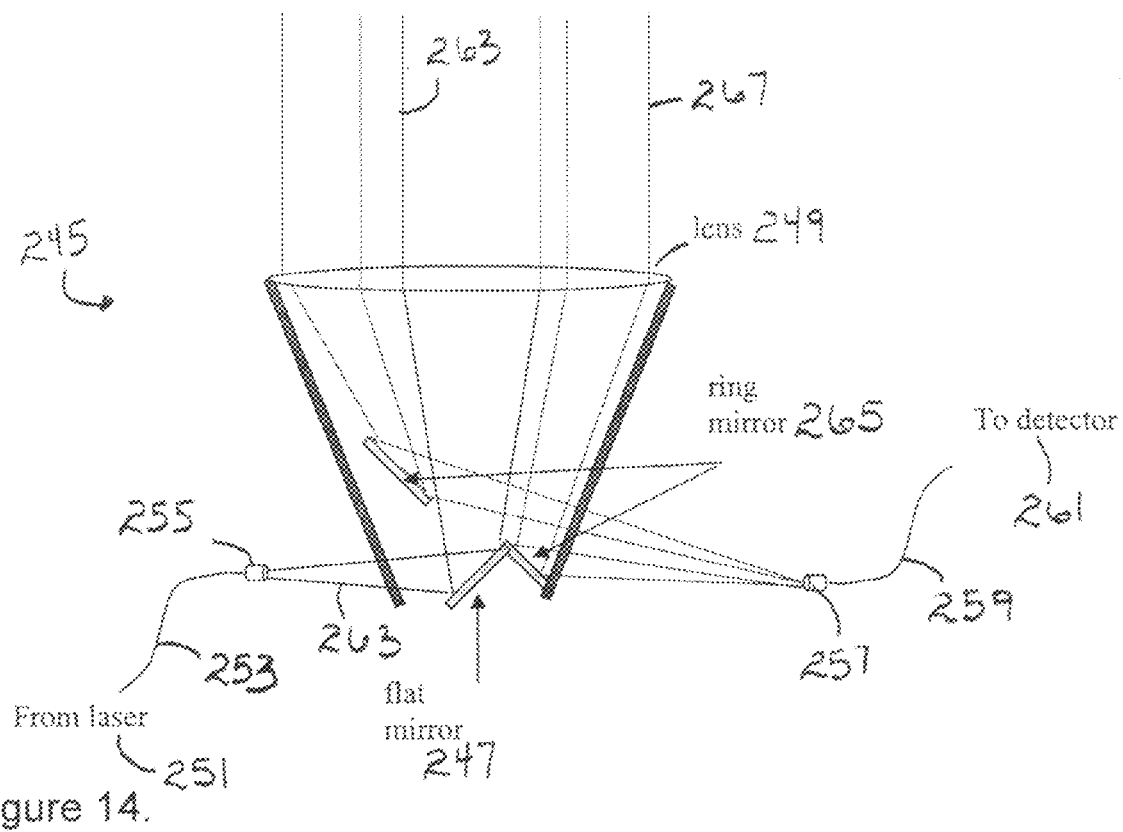
FIG. 14 is an embodiment where optically flat mirrors are used in combination with a collimating lens.

FIG. 14 shows an embodiment 245 where optically flat mirrors 247 are used in combination with a collimating lens 249. This embodiment maintains the symmetry of the system of FIG. 13. A transmitter 251, transmitter optical fiber 253 and transmitter optical fiber head 255 are located on an opposite side of the device 245 than the receiver optical fiber head 257, receiver optical fiber 259 and detector 261. A compact mirror assembly in the middle consists of the center mirror 247 for reflecting a transmitter beam 263 to the collimating lens 249. A ring mirror 265 reflects focused return light 267 from the outer section of the lens 249 into the receiver optical fiber 259.

While the invention has been described with reference to specific embodiments, modifications and variations of the invention may be constructed without departing from the scope of the invention.

The invention claimed is:

1. A lidar apparatus comprising:
   a source of transmitted light,
   a transmitting optical fiber for carrying transmitted light from the source to a transmitting optical fiber end and out of the transmitting optical fiber end,
   a first collimating lens in the path of the transmitted light,
   a second collimating lens in the path of received light,
   a receiving optical fiber end on a receiving optical fiber for receiving the received light from the second collimating lens and carrying the received light to a detector, and
   wherein the transmitted light and the received light are coaxial exiting and entering the apparatus.

2. The apparatus of claim 1, wherein the source is a laser.

3. The apparatus of claim 1, wherein the first collimating lens is smaller than the second collimating lens and is placed in an opening in the center of the second collimating lens.

4. The apparatus of claim 1, further comprising a collimating optical subsystem wherein the collimating optical subsystem is supported by the second collimating lens.

5. A lidar apparatus comprising:
   a source of transmitted light,
   a transmitting optical fiber for carrying transmitted light from the source to a transmitting optical fiber end and out of the transmitting optical fiber end,
   a first optical device in the path of the transmitted light,
   a second optical device in the path of received light,
   a receiving optical fiber end on a receiving optical fiber for receiving the received light and carrying the received light to a detector, and
   wherein the transmitted light and received light are coaxial exiting and entering the apparatus.

6. The apparatus of claim 5, wherein the source is a laser.

7. The apparatus of claim 5, wherein the receiving optical fiber end is inverted with respect to the direction of travel of the transmitted light out of the apparatus and is closer to the first optical device than the receiving optical fiber end.

8. The apparatus of claim 7, wherein the first optical device is a collimating lens and the second optical device is a parabolic or spherical mirror.

9. The apparatus of claim 5, wherein the transmitting optical fiber end and the receiving optical fiber end are inverted with respect to the direction of travel of the transmitted light out of the apparatus and the transmitting optical fiber end is closer to the first optical device than the receiving optical fiber end.

10. The apparatus of claim 9, wherein the second optical device is a collimating mirror and the first optical device is a smaller collimating mirror placed in an opening in the center of the second optical device.

11. The apparatus of claim 9, further comprising an axion or waxicon between the transmitting optical fiber and the first optical device for offsetting the brightest portion of the transmitted light axially outward.

12. The apparatus of claim 5, wherein the first optical device is a collimating lens, the second optical device is a parabolic or spherical mirror and further comprising a third optical device.

13. The apparatus of claim 12, wherein the third optical device is a collimating assembly with a mirror on a back surface of the collimating assembly.

14. The apparatus of claim 12, wherein the third optical device is a mirror placed between the transmitting optical fiber end and the receiving optical fiber end for reflecting received light from the second optical device into the receiving optical fiber end.

15. The apparatus of claim 14, wherein a top surface of the third optical device is an off angle mirror, and wherein the transmitting optical fiber end is inverted and off angle with respect to the direction of travel of the transmitted light leaving the apparatus.

16. The apparatus of claim 14, wherein a top surface of the third optical device is a flat mirror, wherein the transmitting optical fiber end is inverted with respect to the direction of travel of the transmitted light leaving the apparatus.

17. The apparatus of claim 5, wherein the second optical device is a parabolic or spherical ring mirror, the first optical device is a parabolic or spherical mirror within an opening of the parabolic or spherical ring mirror, and wherein the transmitting optical fiber end and the receiving optical fiber end are located on opposite sides of the apparatus.

18. The apparatus of claim 5, wherein the second optical device is a flat ring mirror, the first optical device is a flat mirror within an opening of the flat ring mirror, and wherein the transmitting optical fiber end and the receiving optical fiber end are located on opposite sides of the apparatus.

19. The apparatus of claim 18, further comprising a collimating lens for affecting the transmitted light and the received light.

20. A lidar method comprising:

providing transmitted light from a source, through a transmitting optical fiber and to a transmitting optical fiber end, passing the transmitted light to a first optical device and out of the apparatus, receiving received light at a second optical device, passing the received light to a receiving optical fiber end, through a receiving optical fiber and to a detector, and wherein the transmitted light and received light are coaxial exiting and entering the apparatus.

\* \* \* \* \*

UNITED STATES PATENT AND TRADEMARK OFFICE
CERTIFICATE OF CORRECTION

| | | |
|---|---|---|
| PATENT NO. | : 7,894,044 B1 | Page 1 of 1 |
| APPLICATION NO. | : 12/381388 | |
| DATED | : February 22, 2011 | |
| INVENTOR(S) | : Christopher J. Sullivan | |

It is certified that error appears in the above-identified patent and that said Letters Patent is hereby corrected as shown below:

In the Specification:

Column 1, line 3, insert the following paragraph:

--This invention was made with Government support under Contract No. H92222-06-C-0021 awarded by the United States Special Operations Command. The Government has certain rights in this invention.--

Signed and Sealed this
Twentieth Day of May, 2014

Michelle K. Lee
*Deputy Director of the United States Patent and Trademark Office*